United States Patent
Nogami (10) Patent No.: US 8,704,726 B2
(45) Date of Patent: Apr. 22, 2014

(54) ANTENNA APPARATUS AND BASE STATION APPARATUS

(75) Inventor: Toshizo Nogami, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 348 days.

(21) Appl. No.: 13/129,299

(22) PCT Filed: Oct. 20, 2009

(86) PCT No.: PCT/JP2009/068060
§ 371 (c)(1),
(2), (4) Date: Jun. 10, 2011

(87) PCT Pub. No.: WO2010/055749
PCT Pub. Date: May 20, 2010

(65) Prior Publication Data
US 2011/0261773 A1    Oct. 27, 2011

(30) Foreign Application Priority Data

Nov. 14, 2008 (JP) ................................. 2008-291766

(51) Int. Cl.
*H01Q 21/00* (2006.01)
*H01Q 3/22* (2006.01)

(52) U.S. Cl.
USPC .......................................... 343/853; 342/372

(58) Field of Classification Search
USPC ................... 343/853; 342/368, 372, 375, 373; 455/562.1
See application file for complete search history.

(56) References Cited

U.S. PATENT DOCUMENTS

| | | | |
|---|---|---|---|
| 5,686,926 A | 11/1997 | Kijima et al. | |
| 6,667,714 B1 * | 12/2003 | Solondz | 342/368 |
| 7,230,570 B2 * | 6/2007 | Thomas et al. | 342/372 |
| 7,542,722 B2 | 6/2009 | Carlsson | |
| 7,710,326 B2 * | 5/2010 | Lee | 343/700 MS |
| 2007/0167191 A1 | 7/2007 | Carlsson | |
| 2009/0190561 A1 | 7/2009 | Yokoyama | |
| 2010/0067471 A1 | 3/2010 | Matsuzawa | |

FOREIGN PATENT DOCUMENTS

| | | |
|---|---|---|
| CN | 1887013 A | 12/2006 |
| JP | 6-196927 A | 7/1994 |
| JP | 2008-219338 A | 9/2008 |
| WO | WO 2008/068803 A1 | 6/2008 |
| WO | WO 2008/111224 A1 | 9/2008 |

OTHER PUBLICATIONS

3GPP, TSG-RAN1, #53bis, R1-082520, "An Overview of Opportunistic Space Time Mulitple Access", Nortel, Jun. 30-Jul. 4, 2008, Warsaw, Poland.

* cited by examiner

*Primary Examiner* — Hoang V Nguyen
(74) *Attorney, Agent, or Firm* — Birch, Stewart, Kolasch & Birch, LLP (57) ABSTRACT

Two types of array antennas having different down tilt angles are used separately between the outside and inside of the cell in consideration of the transmission mode. A base station apparatus is a base station apparatus that performs wireless communications with a mobile station apparatus, and has a first array antenna 201 having a down tilt angle of $\theta_1$ to perform MIMO (Multiple Input Multiple Output), and a second array antenna 202 having a down tilt angle of $\theta_2$ smaller than that of the first array antenna 201 to perform beam forming.

11 Claims, 8 Drawing Sheets

FIG.1

ANTENNA APPARATUS AND BASE STATION APPARATUS

BACKGROUND OF THE INVENTION

1. Field of the Invention

The present invention relates to an antenna apparatus and base station apparatus having a plurality of types of array antennas.

2. Description of the Related Art

Conventionally, in cellular telephone systems, techniques have been proposed that the base station apparatus uses two types of array antennas having different down tilt angles separately between the outside and inside of the cell. In other words, in the techniques, the base station apparatus controls both a beam to transmit to the outside of the cell with high power and a beam to transmit to the inside of the cell with low power individually.

Non-patent Document 1: 3GPP, TSG-RANI, #53bis, R1-082520, "An Overview of Opportunistic Space Time Multiple Access", Nortel, Jun. 30-Jul. 4, 2008

SUMMARY OF INVENTION

Problems to be Solved by the Invention

However, Non-patent Document 1 does not consider anything about the transmission mode. In other words, it is not clarified how to consider the transmission mode in using two types of array antennas having different down tilt angles separately between the outside and inside of the cell.

The present invention was made in view of such circumstances, and it is an object of the invention to provide an antenna apparatus and base station apparatus capable of using two types of array antennas having different down tilt angles separately between the outside and inside of the cell in consideration of the transmission mode.

Means for Solving the Problem (1) To attain the above-mentioned object, the invention took measures as described below. In other words, an antenna apparatus of the invention has a first array antenna for performing MIMO (Multiple Input Multiple Output) transmission, and a second array antenna having a down tilt angle smaller than that of the first array antenna to perform beam forming.

MIMO transmission is used for mobile station apparatuses with relatively good reception quality. Since such apparatuses have the high possibility of existing in positions near the transmission apparatus (base station apparatus) inside the cell, by making the down tilt angle of the first array antenna relatively larger than that of the second array antenna, it is possible to provide such mobile station apparatuses with high gain. Further, in MIMO transmission, since the beam of the relatively wide range is transmitted in the azimuth-angle direction, there is the high possibility of providing adjacent cells with interference, and by increasing the down tilt angle, it is possible to reduce interference to provide. Meanwhile, beam forming is effective to mobile station apparatuses existing outside the cell. By making the down tilt angle of the second array antenna smaller than the down tilt angle of the first array antenna, it is possible to provide such mobile station apparatuses with high gain. Further, in beam forming, since the relatively narrow beam is transmitted in the azimuth-angle direction, there is the low possibility of providing adjacent cells with interference, and it is possible to reduce interference to provide even using the small tilt angle. Thus, by making the down tilt angle different between MIMO transmission and beam forming, it is possible to perform efficient data transmission.

(2) Further, the antenna apparatus of the invention has a first array antenna having a plurality of antenna elements, and a second array antenna having a down tilt angle smaller than that of the first array antenna, while having a larger spatial correlation value between antenna elements than in the first array antenna.

Thus, the antenna apparatus is provided with the first array antenna having a relatively small spatial correlation value, and the second array antenna having a down tilt angle smaller than that of the first array antenna, while having a larger spatial correlation value between antenna elements than in the first array antenna, and it is thereby possible to perform efficient data transmission.

(3) Furthermore, in the antenna apparatus of the invention, a distance between antenna elements of the second array antenna is shorter than a distance between antenna elements of the first array antenna.

Thus, since the distance between antenna elements of the second array antenna is shorter than the distance between antenna elements of the first array antenna, it is possible to relatively increase the spatial correlation value between antenna elements of the second array antenna. As a result, by making the down tilt angle different between the first array antenna and the second array antenna, it is possible to perform efficient data transmission.

(4) Further, a base station apparatus of the invention is a base station apparatus that performs wireless communications with a mobile station apparatus, and has a first array antenna for performing MIMO (Multiple Input Multiple Output) transmission, and a second array antenna having a down tilt angle smaller than that of the first array antenna to perform beam forming.

MIMO transmission is used for mobile station apparatuses with relatively good reception quality. Since such apparatuses have the high possibility of existing in positions near the transmission apparatus (base station apparatus) inside the cell, by making the down tilt angle of the first array antenna relatively larger than that of the second array antenna, it is possible to provide such mobile station apparatuses with high gain. Further, in MIMO transmission, since the beam of the relatively wide range is transmitted in the azimuth-angle direction, there is the high possibility of providing adjacent cells with interference, and by increasing the down tilt angle, it is possible to reduce interference to provide. Meanwhile, beam forming is effective to mobile station apparatuses existing outside the cell. By making the down tilt angle of the second array antenna smaller than the down tilt angle of the first array antenna, it is possible to provide such mobile station apparatuses with high gain. Further, in beam forming, since the relatively narrow beam is transmitted in the azimuth-angle direction, there is the low possibility of providing adjacent cells with interference, and it is possible to reduce interference to provide even using the small tilt angle. Thus, by making the down tilt angle different between MIMO transmission and beam forming, it is possible to perform efficient data transmission.

(5) Furthermore, the base station apparatus of the invention transmits a common reference signal to a mobile station apparatus from the first array antenna, while transmitting a dedicated reference signal to the mobile station apparatus from the second array antenna.

Thus, the base station apparatus transmits a common reference signal to a mobile station apparatus from the first array antenna, while transmitting a dedicated reference signal to the mobile station apparatus from the second array antenna, and is capable of transmitting the dedicated reference signal to a mobile station apparatus existing in a distant position.

(6) Furthermore, a base station apparatus of the invention is a base station apparatus that performs wireless communications with a mobile station apparatus, and has a first array antenna having a plurality of antenna elements, and a second array antenna having a down tilt angle smaller than that of the first array antenna, while having a larger spatial correlation value between antenna elements than in the first array antenna.

Thus, the base station apparatus is provided with the first array antenna having a relatively small correlation value, and the second array antenna having a down tilt angle smaller than that of the first array antenna, while having a larger spatial correlation value between antenna elements than in the first array antenna, and is thereby capable of performing efficient data transmission.

(7) Still furthermore, the base station apparatus of the invention transmits a common reference signal to a mobile station apparatus from the first array antenna, while transmitting an dedicated reference signal to the mobile station apparatus from the second array antenna.

Thus, the base station apparatus transmits a common reference signal from the first array antenna, while transmitting an dedicated reference signal apparatus from the second array antenna, and is capable of transmitting the dedicated reference signal to a distant mobile station apparatus.

(8) Moreover, a base station apparatus of the invention is the base station apparatus—that transmits transmission data to a mobile station apparatus using a plurality of transmission modes with different transmission rates, and transmits transmission data in a first transmission mode using the first array antenna, while transmitting transmission data in a second transmission mode with a transmission rate lower than that in the first transmission mode using the second array antenna.

Thus, the transmission data is transmitted in the second transmission mode with a transmission rate lower than that in the first transmission mode using the second array antenna, and it is possible to perform transmission harder to undergo the effect of variations in the propagation path than in the first transmission mode on a distant mobile station apparatus.

(9) Further, a base station apparatus of the invention is a base station apparatus that transmits transmission data to a mobile station apparatus using a plurality of transmission modes with different transmission rates, and has a first array antenna, and a second array antenna having a down tilt angle smaller than that of the first array antenna, and transmitting transmission data in a first transmission mode using the first array antenna, while transmitting transmission data in a second transmission mode with a transmission rate lower than that in the first transmission mode using the second array antenna.

Thus, the transmission data is transmitted in the second transmission mode with a transmission rate lower than that in the first transmission mode using the second array antenna, and it is possible to perform transmission harder to undergo the effect of variations in the propagation path than in the first transmission mode on a distant mobile station apparatus.

(10) Furthermore, a base station apparatus of the invention is a base station apparatus that transmits a physical control channel and a physical shared channel to a mobile station apparatus, and is characterized by having a first array antenna, and a second array antenna having a down tilt angle smaller than that of the first array antenna, and transmitting the physical control channel using the first array antenna, while transmitting the physical shared channel using the second array antenna.

Thus, the base station apparatus transmits the physical shared channel using the second array antenna, and is thereby capable of directing the beam to the mobile station apparatus existing in a distant position.

Advantageous Effect of the Invention

According to the invention, by making the down tilt angle between MIMO transmission and beam forming, it is possible to perform efficient data transmission.

DESCRIPTION OF SYMBOLS

101 Base station apparatus
102, 103, 104, 105 Mobile station apparatus
200 Transmission antenna apparatus
201 MIMO array
201-1~201-4 Antenna element
202 BF array
202-1~202-8 Antenna element
301 Antenna element
301-1~301-3 Antenna element
302 Power supply line
400 Transmission antenna apparatus
401 MIMO array
402 BF array

DETAILED DESCRIPTION OF THE INVENTION

An Embodiment according to the invention will be described below with reference to drawings. In the invention, different transmission antennas are used in a mode (hereinafter, referred to as a "MIMO mode") using MIMO (Multiple Input Multiple Output) and in another mode (hereinafter, referred to as a "BF mode") using beam forming. Then, by making the tilt angles (down tilt angles) of transmission antennas used in respective modes different from each other, efficient data transmission is made possible.

Figure 1:
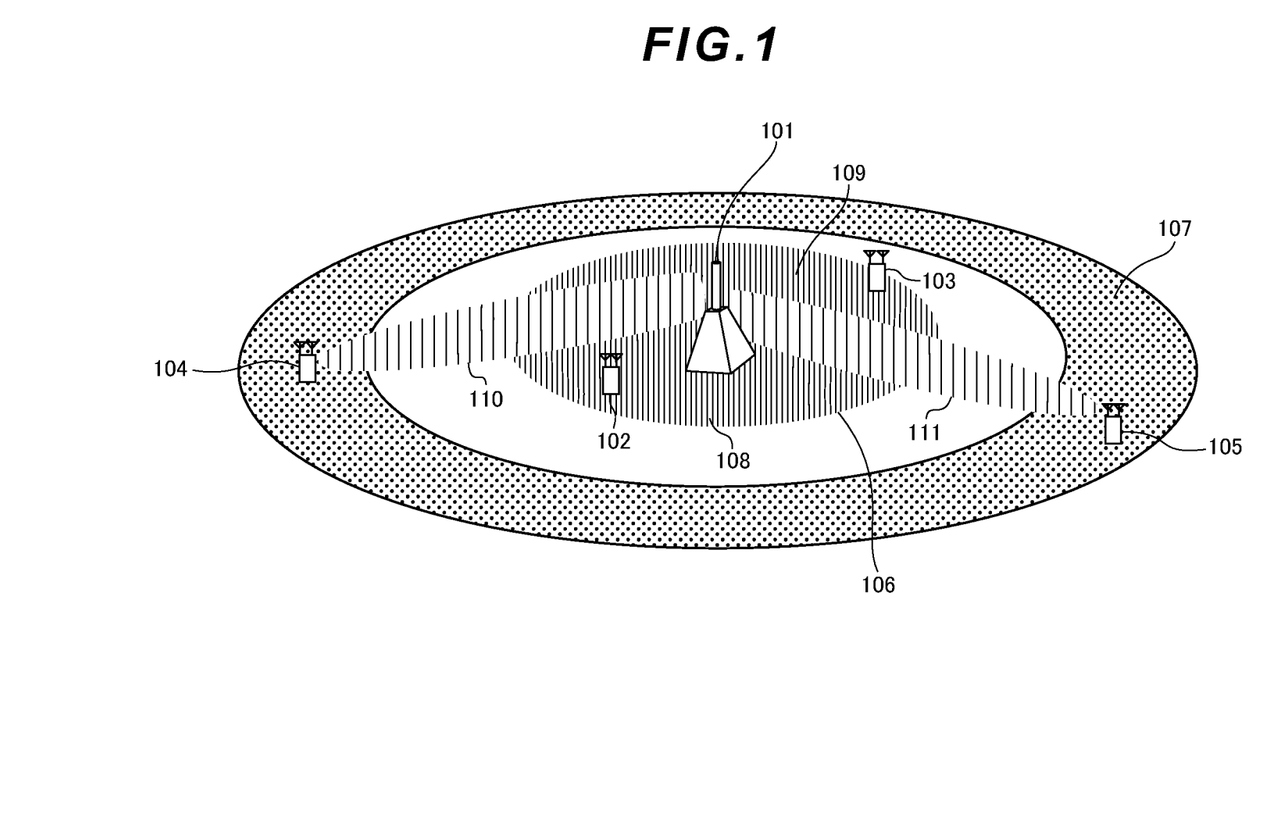
FIG. 1 is a diagram showing an example of a cell assumed in this Embodiment.

FIG. 1 is a diagram showing an example of a cell assumed in this Embodiment. In the cell, a base station apparatus (transmission apparatus) 101 communicates with mobile station apparatuses 102, 103, 104 and 105 that are a plurality of mobile station apparatuses (reception apparatuses). The base station apparatus communicates with the mobile station apparatuses 102 and 103 that are mobile station apparatuses existing inside the cell, i.e. an area 106 to transmit signals with low transmission power, in the MIMO mode. Meanwhile, the base station apparatus communicates with the mobile station apparatuses 104 and 105 that are mobile station apparatuses existing outside the cell, i.e. an area 107 to transmit signals with low transmission power, in the BF mode.

In the MIMO mode, transmission is performed using relatively broad antenna patterns (108, 109) in the azimuth-angle direction. Meanwhile, in the BF mode, narrow beams (110, 111) are formed in the azimuth-angle direction. By the BF mode, it is possible to obtain sufficient gain even in a mobile station apparatus positioned at a distance from the base station apparatus.

Embodiment 1

Figure 2A:
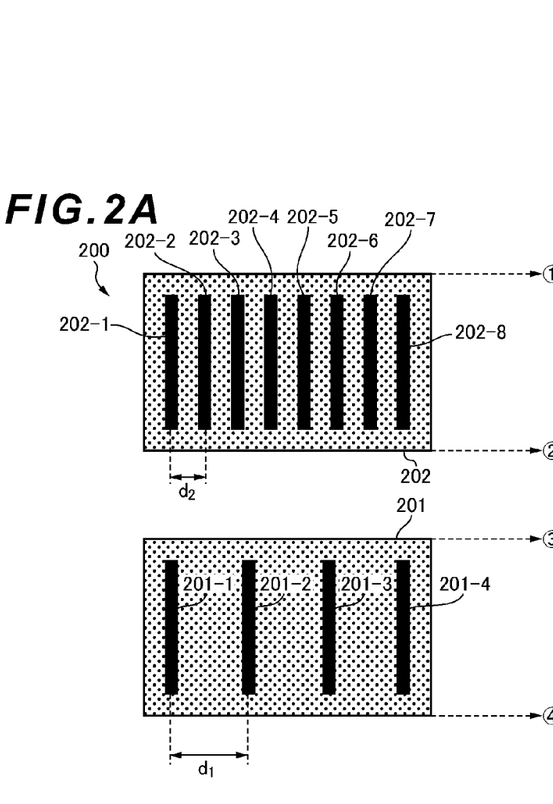
FIG. 2A is a diagram showing an example of a transmission antenna apparatus (antenna apparatus) 200 of a base station apparatus according to this Embodiment.
Figure 2B:
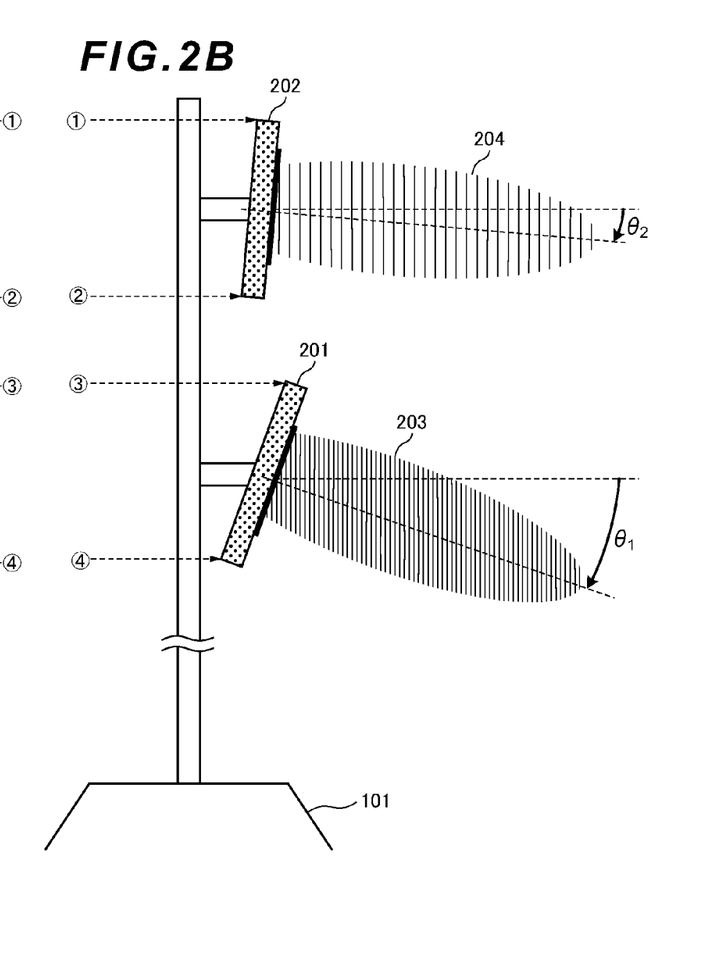
FIG. 2B is another diagram showing an example of the transmission antenna apparatus (antenna apparatus) 200 of the base station apparatus according to this Embodiment.

Embodiment 1 describes an example of the antenna tilt suitable for the case of using different array antennas corresponding to transmission modes. FIGS. 2A and 2B are diagrams showing an example of a transmission antenna apparatus (antenna apparatus) 200 of a base station apparatus according to this Embodiment. The transmission antenna apparatus 200 has an array antenna (MIMO array) 201 for MIMO mode transmission, and an array antenna (BF array) 202 for BF mode transmission. The MIMO array 201 is provided with the tilt angle of $\theta_1$ in the elevation-angle direction, and the BF array 202 is provided with the tilt angle (down tilt angle) of $\theta_2$ in the elevation-angle direction. At this point, $\theta_1$ is set at a value (absolute value) larger than the tilt angle (down tilt angle) of $\theta_2$ ($\theta_2$ can be zero.) By this means, it is possible to direct a beam 203 transmitted from the MIMO array 201 to a mobile station apparatus in a position near the transmission apparatus, as compared with a beam 204 transmitted from the BF array 202. In addition, this Embodiment shows the example of physically tilting the antenna in the elevation-angle direction in providing the tilt angle.

The MIMO mode is a mode used for mobile station apparatuses such that the reception quality is relatively good. Such apparatuses have the high possibility of existing in positions near the transmission apparatus inside the cell, and therefore, by increasing the tilt angle of the MIMO array 201, it is possible to provide such mobile station apparatuses with high gain. Further, in the MIMO mode, since the relatively broad beam is transmitted in the azimuth-angle direction, there is the high possibility of providing adjacent cells with interference, and by increasing the tilt angle, it is possible to reduce interference to provide.

Meanwhile, the BF mode is a mode effective to mobile station apparatuses existing outside the cell. By decreasing the tilt angle of the beam of the BF array 202, it is possible to provide these mobile station apparatuses with high gain. Further, in the BF mode, since the relatively narrow beam is transmitted in the azimuth-angle direction, there is the low possibility of providing adjacent cell with interference, and even by using the small tilt angle, it is possible to reduce interference to provide. It is more preferable to form the beam for suppressing interference imposed on adjacent cells.

In addition, herein, it is described that the BF mode is effective to mobile station apparatuses existing outside the cell, but a mode for performing inter-cell coordination communications is included. In other words, such a case is included that a beam is formed to a mobile station apparatus existing in the adjacent cell and that signals are transmitted in coordination. In this case, the outside of the cell is an area for holding mobile station apparatuses using the BF array, and includes adjacent cells.

Referring to FIG. 2A, described next is an example of configurations of the MIMO array 201 and BF array 202. The MIMO array 201 has four antenna elements, 201-1 to 201-4. The antenna elements are spaced a distance $d_1$ apart from one another. As a value of $d_1$, it is preferable to use a value for decreasing the spatial correlation value between antenna elements.

In addition, herein, the description is given using the MIMO array having the linear array configuration, but the invention is not limited thereto. For example, other array configurations may be adopted such as a ring-shaped array and polarization array such that the spatial correlation value between antenna elements is relatively large.

The BF array 202 has eight antenna elements, 202-1 to 202-8. The antenna elements are spaced a distance $d_2$ apart from one another. As a value of $d_2$, it is preferable to use a value such that the spatial correlation value between antenna elements is relatively large (smaller than d1), and more preferably, the value is set at a distance of a wavelength almost half that of the carrier frequency.

In addition, herein, the description is given using the BF array having the linear array configuration, but the invention is not limited thereto. For example, other array configurations may be adopted such as a ring-shaped array with short distances between array elements such that the spatial correlation value between antenna elements is relatively large. In addition, as the number of antenna elements, the value shown herein is an example, and may be any other values.

Thus, by using different transmission antennas in the mode (MIMO mode) using MIMO and in the mode (BF mode) using beam forming, and making the tilt angle different between the transmission antennas (the array antenna with the small spatial correlation value and the array antenna with the relatively large spatial correlation value) used in the respective modes, it is possible to perform efficient data transmission.

Embodiment 2

Embodiment 1 describes the example of physically tilting the antenna in the elevation-angle direction in adding the down tilt angle. In this Embodiment, each antenna element is further comprised of a plurality of elements. Then, instead of physically tilting the antenna in the elevation-angle direction, the tilt angle is set by providing a phase difference in supplying power to these elements.

Figure 3A:
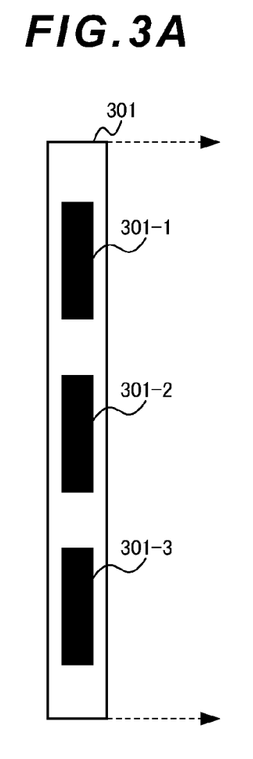
FIG. 3A is a diagram showing an example of a configuration of an antenna element according to this Embodiment.
Figure 3B:
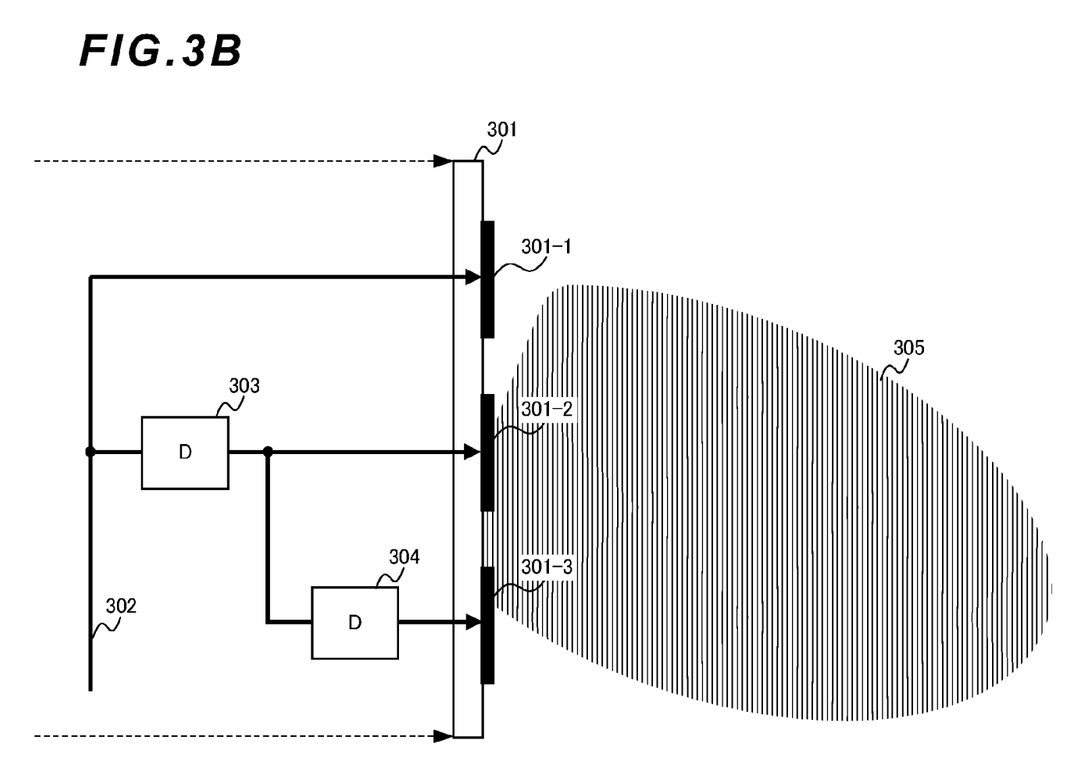
FIG. 3B is another diagram showing an example of the configuration of the antenna element according to this Embodiment.

FIGS. 3A and 3B are diagrams showing an example of a configuration of an antenna element according to this Embodiment. The antenna element 301 further has a plurality of elements (301-1~301-3). In supplying power to the elements (301-1~301-3) via a power supply line 302, by using delay elements (303, 304), a phase difference is added to in between 301-1 and 301-2 and between 301-2 and 301-3. By this means, it is possible to add the tilt angle to an antenna pattern 305 in the elevation angle of the antenna element 301. The distances between elements are fixed, and by controlling the phase difference given by the delay elements, it is possible to control the tilt angle. More specifically, by setting the phase difference by the delay elements to be large (or simply using a delay element with large delay), it is possible to set degrees of the tilt angle at high degrees.

Figure 4A:
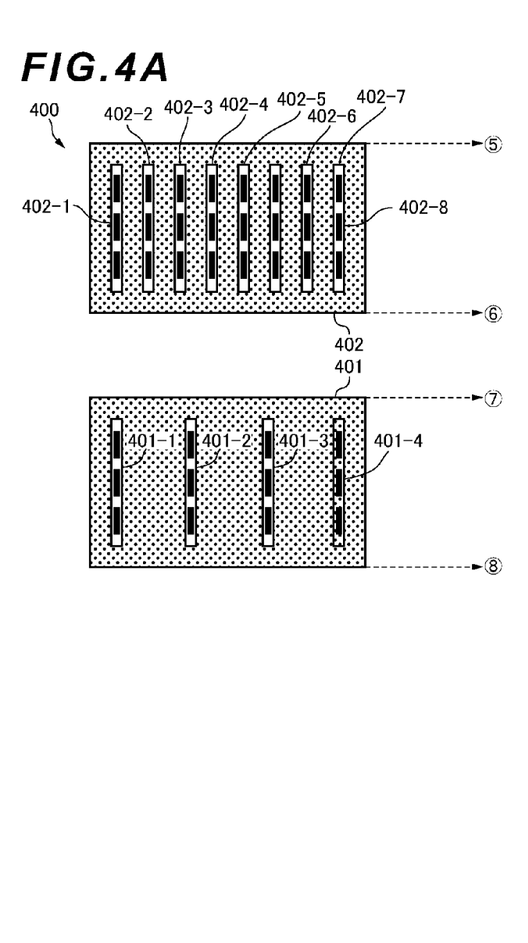
FIG. 4A is a diagram showing an example of a transmission antenna apparatus 400 according to this Embodiment.
Figure 4B:
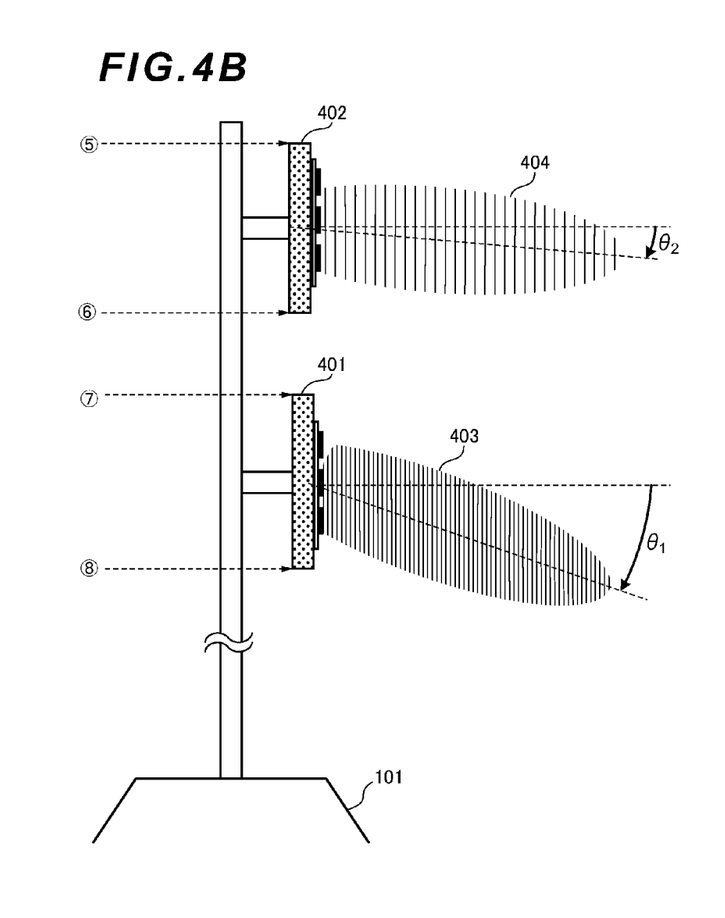
FIG. 4B is another diagram showing an example of the transmission antenna apparatus 400 according to this Embodiment.

FIGS. 4A and 4B are diagrams showing an example of a transmission antenna apparatus 400 according to this Embodiment. The transmission antenna apparatus 400 has a MIMO array (array with a small spatial correlation value) 401 and BF array (array with a relatively large spatial correlation value) 402. The MIMO array 401 has a plurality of antenna elements (401-1~401-4) as shown FIGS. 3A and 3B. The phase difference by the delay elements is set at a relatively large value to add the tilt angle of $\theta_1$ in the elevation-angle direction. The BF array 402 is also has a plurality of antenna elements (402-1~402-8) as shown in FIGS. 4A and 4B, and by setting the phase difference by the delay elements at a relatively small value (or not providing the phase difference) to add the tilt angle of $\theta_2$ in the elevation-angle direction. At this point, by setting the phase difference suitably, $\theta_1$ is set at a value larger than $\theta_2$. By this means, it is possible to direct a beam 403 transmitted from the MIMO array 401 to a mobile station apparatus in a position near the transmission apparatus, as compared with a beam 404 transmitted from the BF array 402.

Thus, by using different transmission antennas in the mode (MIMO mode) using MIMO and in the mode (BF mode) using beam forming, and making the tilt angle different between the transmission antennas (the array antenna with the small spatial correlation value and the array antenna with the relatively large spatial correlation value) used in the respective modes, it is possible to perform efficient data transmission.

In addition, the above-mentioned Embodiments respectively describe the method of physically tilting and the method of electrically tilting in providing two array antennas with different tilt angles, but the invention is not limited thereto. For example, the invention is applicable to the case of providing two array antennas with different tilt angles by using other methods, for example, using antennas with different directional patterns in the elevation-angle direction in the MIMO mode and the BF mode, etc.

Embodiment 3

Figure 5:
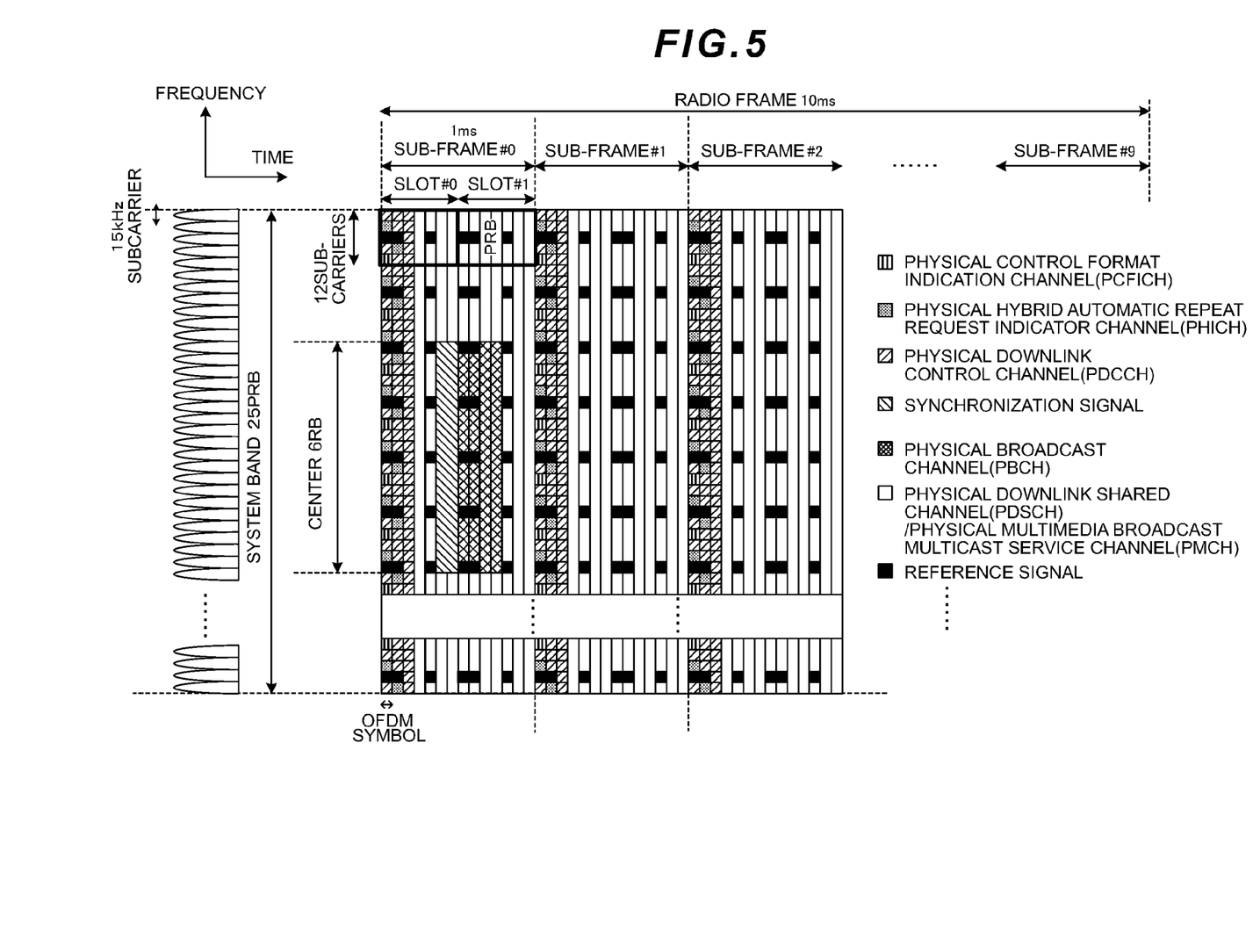
FIG. 5 is a diagram showing an example of a downlink sub-frame configuration.

Embodiments 1 and 2 show the examples of the configurations of the transmission antenna apparatuses. This Embodiment describes signals transmitted from the MIMO array and the BF array using an example of sub-frame configurations of the MIMO mode and the BF mode. FIG. 5 is a diagram showing an example of a downlink sub-frame configuration. The sub-frame includes a data channel (PDSCH (Physical Downlink Shared CHannel) or PMCH (Physical Multimedia broadcast multicast service CHannel)), control channel (PCFICH (Physical Control Format Indication CHannel)), PHICH (Physical Hybridautomatic repeat request Indicator CHannel), PDCCH (Physical Downlink Control CHannel), synchronization signal and reference signal.

Figure 6:
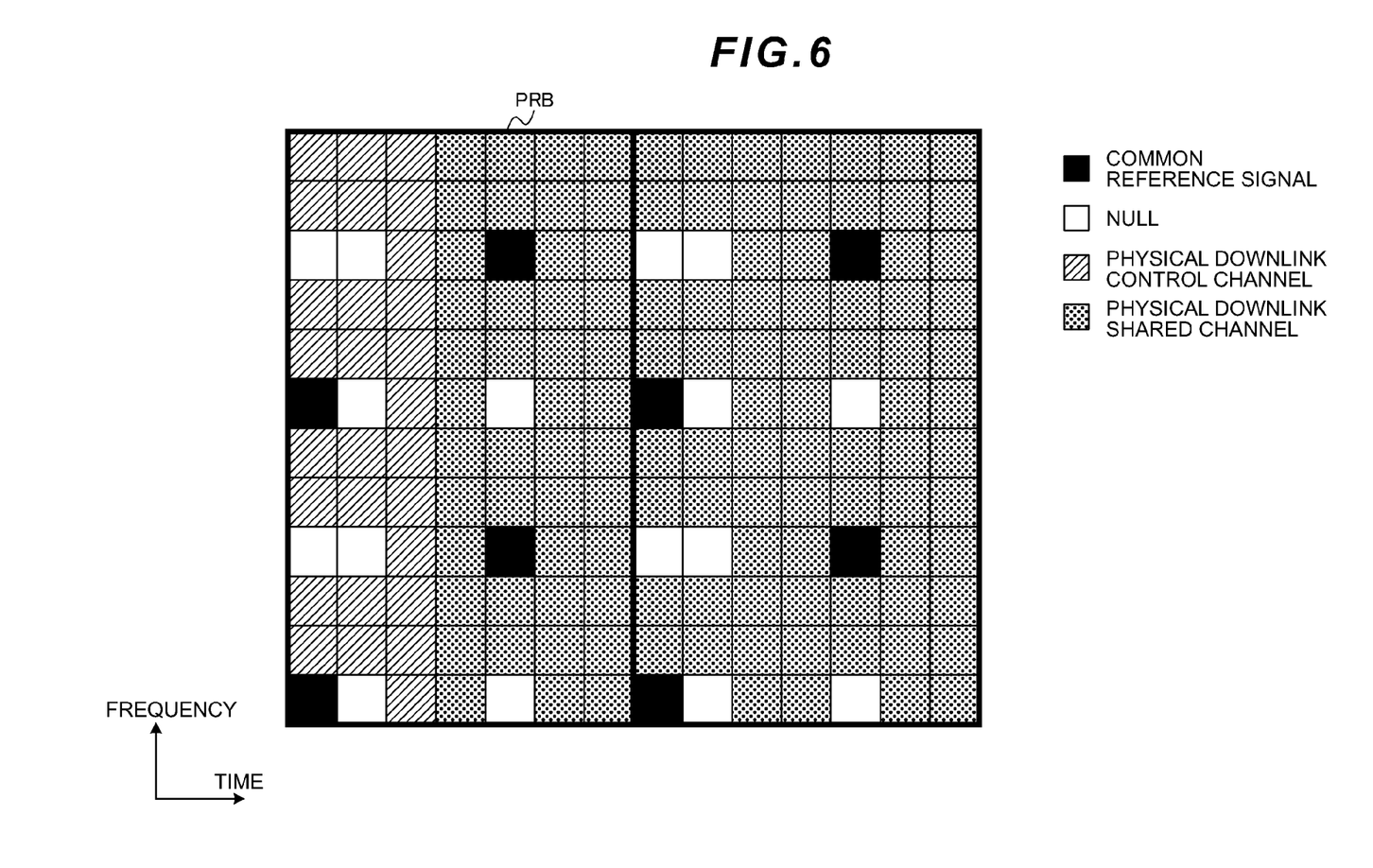
FIG. 6 is a diagram showing an example of a configuration of PRB to a mobile station apparatus in a MIMO mode.

Each sub-frame includes a plurality of ("2" in FIG. 5) slots in the time direction, and is comprised of subcarriers grouped every the predetermined number of ("12" in FIG. 5) subcarriers in the frequency direction. An area comprised of one slot in the time direction and the predetermined number of subcarriers in the frequency direction is called PRB (Physical Resource Block), and the PRB is a unit to assign a mobile station apparatus. FIG. 6 is a diagram showing an example of a configuration of the PRB to a mobile station apparatus in the MIMO mode. In addition, FIG. 6 shows only the PRB configuration corresponding to a single port (herein, assumed to be port #0) among PRB configurations corresponding to a plurality of MIMO ports (logical port and antenna port). The PRB shown in FIG. 6 includes the physical control channel, physical shared channel and common reference signal. The common reference signal is subjected to time or frequency division multiplexing among ports of MIMO, and null signals are mapped to a position, in which the common reference signal is mapped from one port, in the other ports, and are orthogonalized. In other words, in the position of the null signal of this port, the common reference signal of one of the other ports is transmitted. The physical control channel undergoes diversity transmission using a plurality of MIMO ports.

Figure 7:
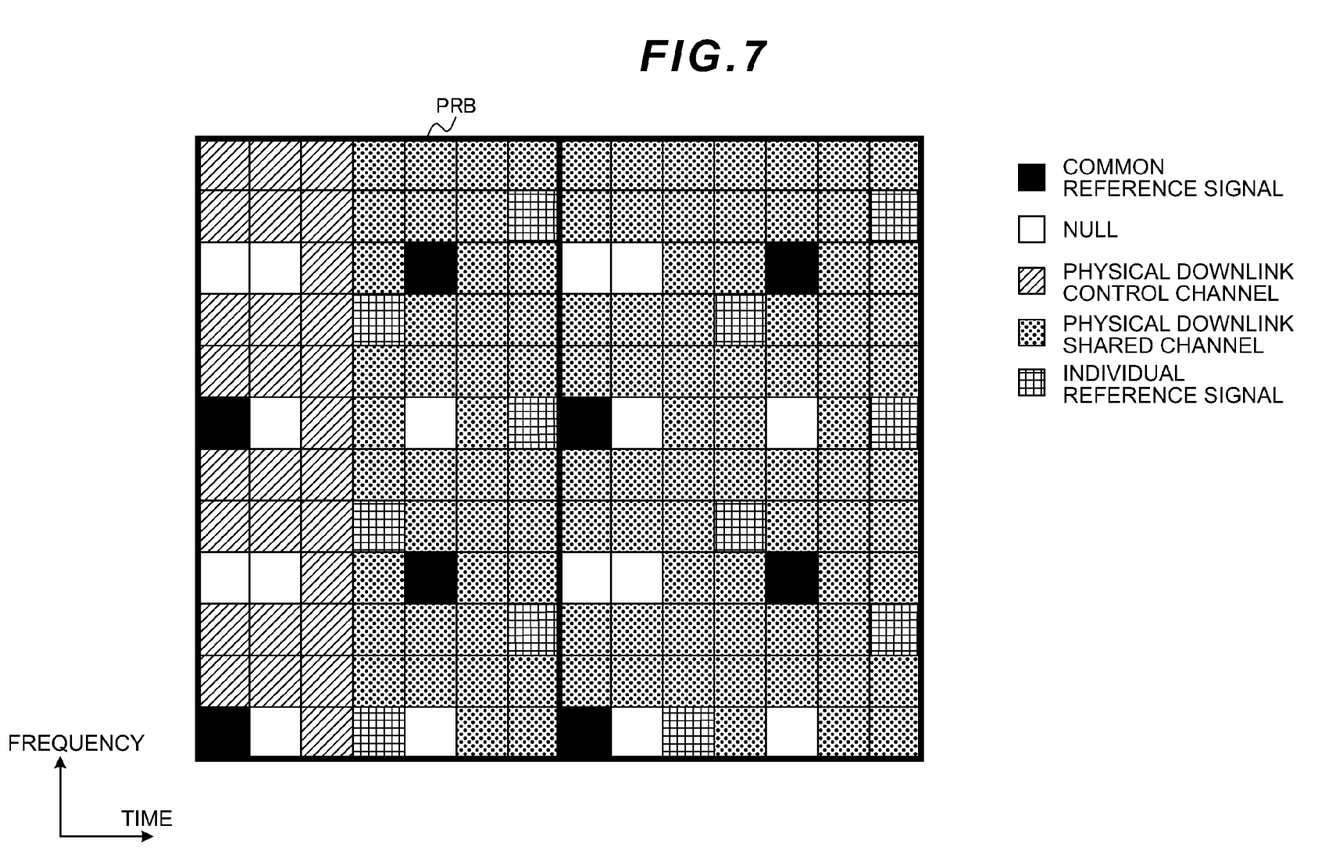
FIG. 7 is a diagram showing an example of a configuration of PRB to a mobile station apparatus in a BF mode.
Figure 8:
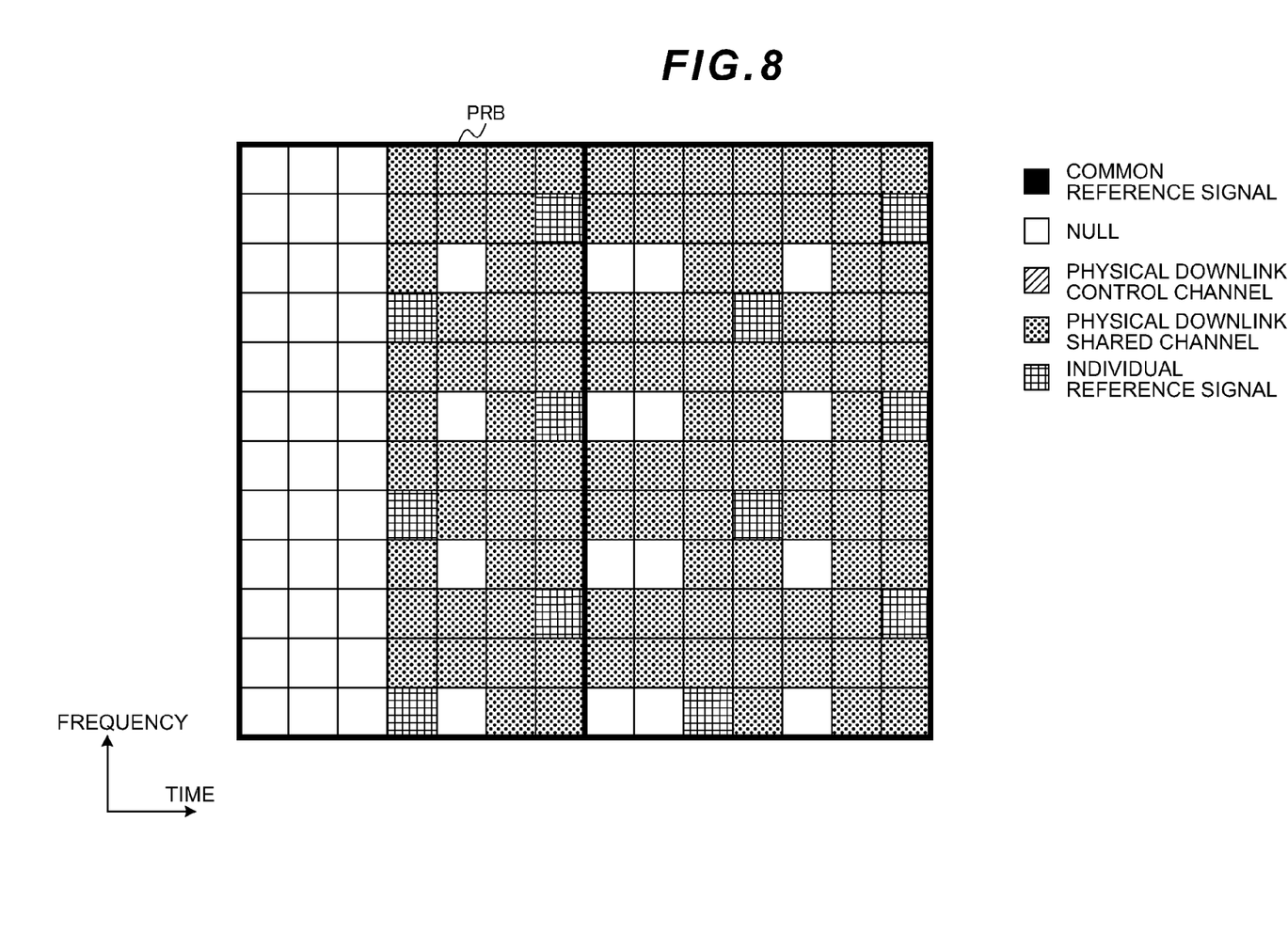
FIG. 8 is another diagram showing an example of the configuration of PRB to a mobile station apparatus in the BF mode.

FIGS. 7 and 8 are diagrams showing an example of a configuration of the PRB to a mobile station apparatus in the BF mode. Also in the PRB to the mobile station apparatus in the BF mode, the physical control channel and common reference channel are transmitted from MIMO ports. Herein, FIG. 7 shows signals transmitted from the port of MIMO, FIG. 8 shows signals transmitted from the port of FB, and the PRB is the same. In addition, FIG. 7 shows only the PRB configuration corresponding to a single port (herein, assumed to be port #0) among PRB configurations corresponding to a plurality of MIMO ports. The PRB shown in FIG. 7 includes the physical control channel and common reference signal. The common reference signal is subjected to time or frequency division multiplexing among ports of MIMO, and null signals are mapped to a position, in which the common reference signal is mapped from one port, in the other ports, and are orthogonalized. In other words, in the position of the null signal of this port, the common reference signal of one of the other ports is transmitted.

Further, in the positions in which the physical shared channel and dedicated reference signal are mapped in the port of BF, null signals are mapped in all the ports of MIMO, and the port of BF and each port of MIMO are orthogonalized from each other. The physical control channel undergoes diversity transmission using a plurality of MIMO ports. The PRB as shown in FIG. 8 includes the physical shared channel and the dedicated reference signal. The dedicated reference signal is a reference signal inserted only in the PRB transmitted from the port of BF. In the positions in which the physical control channel and the common reference signals are mapped in each port of MIMO, null signals are mapped in the port of BF, and are orthogonalized.

In addition, as a scheme of transmitting the physical control channel, diversity transmission is described, and it is possible to use other methods using the port of MIMO such as space multiplexing using each port of MIMO, etc.

Described next is the correspondence between the logical port and the transmission array antenna. The above-mentioned ports of MIMO are associated with the antenna elements 201-1 to 201-4 of the MIMO array 201 in Embodiment 1, while the above-mentioned port of BF is associated with the entire BF array 202 in Embodiment 1. Thus, in the PRB to the mobile station apparatus in the MIMO mode, the physical control channel, physical shared channel and common reference signal are transmitted in the tilt angle of $\theta_1$. Further, in the PRB to the mobile station apparatus in the BF mode, the physical control channel and common reference signal are transmitted in the tilt angle of $\theta_1$, and the physical shared channel and dedicated reference signal are transmitted in the tilt angle of $\theta_2$. By this means, it is possible to direct the beam to the mobile station apparatus in a distant position from the transmission apparatus on the physical shared channel and dedicated reference signal, as compared with the physical control channel, physical shared channel and common reference signal.

In addition, described herein is the case that the port of MIMO and the antenna element of the MIMO array are in a one-to-one correspondence, but the invention is not limited thereto. For example, a single port (vertical port) of MIMO may be associated with a plurality of antenna elements.

Further, it is described herein that the port of BF is a port used for a mobile terminal apparatus existing outside the cell, but the port of BF includes ports for performing inter-cell coordination communications. In other words, such a port is included that a beam is formed to a mobile station apparatus existing in the adjacent cell and that signals are transmitted in coordination. In this case, the outside of the cell is an area for holding mobile station apparatuses using the BF array, and includes adjacent cells.

Thus, by using different transmission antennas in the mode (MIMO mode) using MIMO and in the mode (BF mode) using beam forming, and making the tilt angle different between the transmission antennas (the array antenna with the small spatial correlation value and the array antenna with the relatively large spatial correlation value) used in the respective modes, it is possible to perform efficient data transmission.

In addition, each of the above-mentioned Embodiments describes the example of performing transmission using two array antennas, but the invention is not limited thereto. The invention is similarly applicable to the case where the combination of any two array antennas is used in the MIMO mode and the BF mode even when three or more array antennas are used for transmission.

In addition, each of the above-mentioned Embodiments describes the case of transmission, and the invention is also applicable to the case of reception. In other words, by providing a reception array antenna for performing MIMO reception and another reception array antenna for performing BF reception, and setting the tilt angle of the reception array antenna for performing MIMO reception at an angle larger than the tilt angle of the reception array antenna for performing BF reception, it is possible to obtain the same effect as in the case of transmission.

The invention claimed is:

1. An antenna apparatus comprising:
a first array antenna for performing MIMO (Multiple Input Multiple Output) transmission; and
a second array antenna having a down tilt angle smaller than that of the first array antenna to perform beam forming.

2. An antenna apparatus comprising:
a first array antenna having a plurality of antenna elements; and
a second array antenna having a down tilt angle smaller than that of the first array antenna, while having a larger spatial correlation value between antenna elements than in the first array antenna.

3. The antenna apparatus according to claim 2, wherein a distance between antenna elements of the second array antenna is shorter than a distance between antenna elements of the first array antenna.

4. A base station apparatus that performs wireless communications with a mobile station apparatus, comprising:
a first array antenna for performing MIMO (Multiple Input Multiple Output) transmission; and
a second array antenna having a down tilt angle smaller than that of the first array antenna to perform beam forming.

5. The base station apparatus according to claim 4, wherein the base station apparatus transmits a common reference signal to a mobile station apparatus from the first array antenna, while transmitting an dedicated reference signal to the mobile station apparatus from the second array antenna.

6. A base station apparatus that performs wireless communications with a mobile station apparatus, comprising:
a first array antenna having a plurality of antenna elements; and
a second array antenna having a down tilt angle smaller than that of the first array antenna, while having a larger spatial correlation value between antenna elements than in the first array antenna.

7. The base station apparatus according to claim 6, wherein the base station apparatus transmits a common reference signal to a mobile station apparatus from the first array antenna, while transmitting an dedicated reference signal to the mobile station apparatus from the second array antenna.

8. A base station apparatus, wherein the base station apparatus is the base station apparatus according to claim 6 that transmits transmission data to a mobile station apparatus using a plurality of transmission mode with different transmission rates, and transmits transmission data in a first transmission mode using the first array antenna, while transmitting transmission data in a second transmission mode with a transmission rate lower than that in the first transmission mode using the second array antenna.

9. A base station apparatus that transmits transmission data to a mobile station apparatus using a plurality of transmission mode with different transmission rates, comprising
a first array antenna for performing MIMO (Multiple Input Multiple Output) transmission; and
a second array antenna having a down tilt angle smaller than that of the first array antenna,
wherein the base station apparatus transmits transmission data in a transmission mode different from the MIMO transmission with a transmission rate lower than that in the first transmission mode using the second array antenna.

10. A base station apparatus that transmits a physical control channel and a physical shared channel to a mobile station apparatus, comprising:
a first array antenna; and
a second array antenna having a down tilt angle smaller than that of the first array antenna,
wherein the base station apparatus transmits the physical control channel using the first array antenna, while transmitting the physical shared channel using the second array antenna.

11. An antenna apparatus comprising:
a first array antenna having a plurality of antenna elements; and
a second array antenna having a down tilt angle smaller than that of the first array antenna with an antenna element distance shorter than in the first array antenna.

* * * * *